United States Patent [19]
Jenkins et al.

[11] Patent Number: 5,578,398
[45] Date of Patent: Nov. 26, 1996

[54] PERFORATED SUBSTRATE AND METHOD OF MANUFACTURE

[75] Inventors: Carlton G. Jenkins, Sugar Grove, Pa.; David R. Hurst, Manalapan, Fla.

[73] Assignee: Precious Plate Florida, West Palm Beach, Fla.

[21] Appl. No.: 572,184

[22] Filed: Dec. 13, 1995

[51] Int. Cl.⁶ ........................................ H01M 4/74
[52] U.S. Cl. ........................... 429/233; 429/241,245
[58] Field of Search ......................... 29/2; 429/239, 429/240, 241, 243, 244, 245; 72/326; 428/134–136, 596

[56] References Cited

U.S. PATENT DOCUMENTS

| | | | |
|---|---|---|---|
| 793,078 | 6/1905 | Hubbell . | |
| 1,347,873 | 7/1920 | Rabe | 429/239 |
| 1,369,353 | 2/1921 | Rabe | 429/239 |
| 2,031,170 | 12/1935 | Haunz | 29/2 |
| 2,724,733 | 11/1955 | Hagspihl et al. | 136/19 |
| 4,105,832 | 8/1978 | Sugalski | 429/94 |
| 4,189,533 | 2/1980 | Sugalski | 429/241 |
| 4,345,452 | 8/1982 | Eberle | 72/452 |
| 4,717,633 | 1/1988 | Hauser | 429/209 |
| 5,053,292 | 10/1991 | Hasebe et al. | 429/101 |

*Primary Examiner*—Anthony Skapars
*Attorney, Agent, or Firm*—Hodgson, Russ, Andrews, Woods & Goodyear LLP

[57] ABSTRACT

A perforated substrate having half of the perforations formed from one major surface of the substrate and the other half formed from the opposite major surface, the two major surface being coplanar is described. This introduces equal and opposite stress forces into the substrate which essentially cancel each other and provide a product meeting exacting planarity requirements.

27 Claims, 3 Drawing Sheets

PERFORATED SUBSTRATE AND METHOD OF MANUFACTURE

BACKGROUND OF THE INVENTION

1. Field of the Invention

The present invention generally relates to a perforated substrate, and more particularly, to a planar, electrically conductive substrate provided with a multiplicity of perforations. Such a substrate is useful, for example, as a current collector in an electrochemical cell.

2. Prior Art

It is known to form perforated substrates from a sheet of electrically conductive material wherein the perforations are punched or otherwise introduced into the material from one side only. U.S. Pat. No. 4,345,452 to Eberle describes a punching apparatus for forming a strip of lead alloy substrate material into a battery grid. The punching apparatus includes a support for the substrate material to be punched and biased punch members disposed above the supported material for perforating the substrate through one side. The problem is that the resultant burrs formed on the opposite side at each of the perforations introduce stress forces into the substrate that cause it to bow. Conventionally, the bow is removed from the perforated substrate by pressing out the burrs. However, as the width of the substrate becomes greater, the difficulty of compensating for the bow is magnified.

During battery manufacture, it is extremely critical that the substrate current collector is as planar as possible to allow for high speed lamination of the electrode active material onto the substrate. However, it is often difficult to adequately press out the burrs to provide an acceptably planar substrate, and press compensating to remove the bow from a perforated substrate adds an unnecessary step to the manufacturing process. Therefore, there is a need for a perforated substrate of electrically conductive material that conforms to planarity specifications for commercial use, for example, in the commercial production of batteries.

SUMMARY OF THE INVENTION

The present invention provides a perforated substrate and method of making the same wherein each of a coplanar first and second major surfaces of the substrate is provided with a similar pattern of perforations extending to the other surface in an alternating configuration between immediately adjacent perforations from one surface to the other along any direction of either of the surfaces. By uniformly alternating the perforations in this manner, the stress forces produced at each perforation are essentially cancelled by the adjacent perforation formed through the opposite major surface of the substrate and the substrate maintains an extremely planar shape. The foregoing is accomplished by a compound punching technique wherein half the perforations are formed from one side of the substrate and the other half are formed from the opposite side.

Such a perforated substrate is useful, for example, as a current collector of an electrode in an electrochemical cell, and the planar characteristic of the thusly perforated substrate is very desirable for use in commercial battery manufacturing.

These and other aspects of the present invention will become more apparent to those of ordinary skill in the art by reference to the following description and to the drawings.

DETAILED DESCRIPTION OF THE INVENTION

Figure 1:
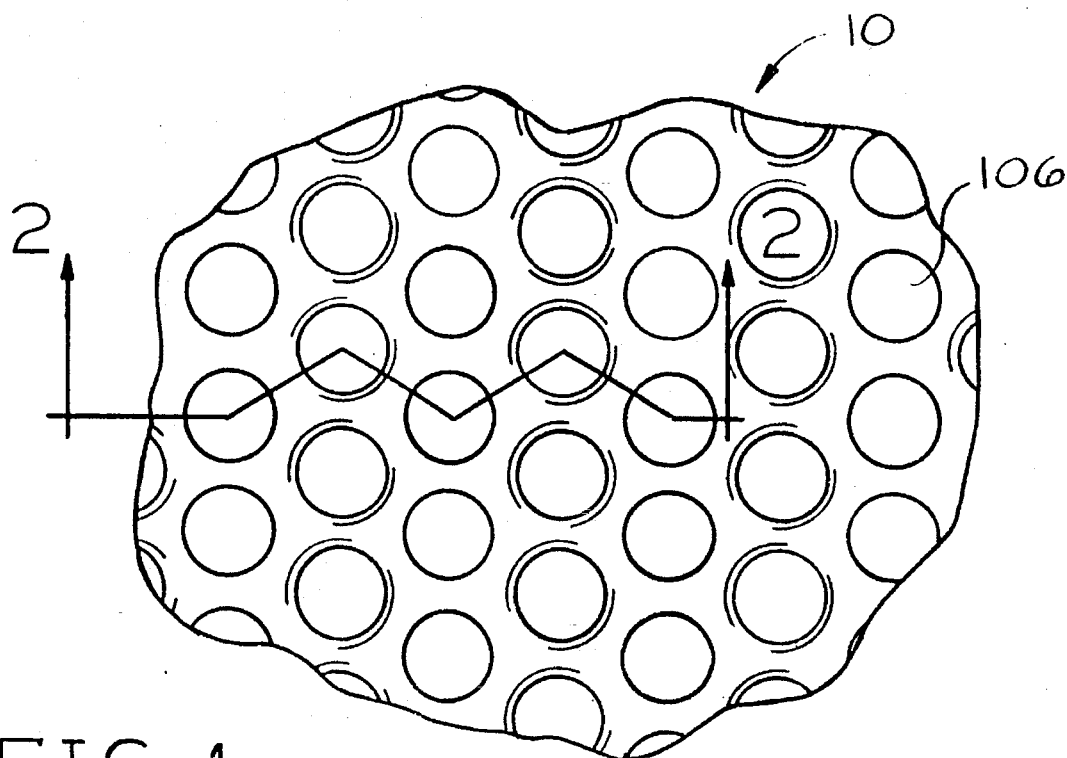
FIG. 1 is a partial, plan view of a perforated substrate according to the present invention.
Figure 2:
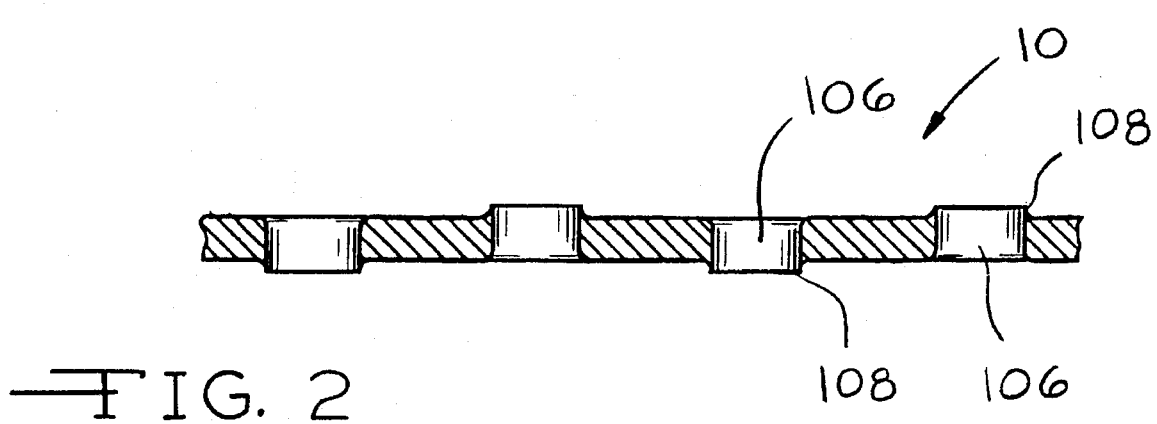
FIG. 2 is a cross-sectional view along line 2—2 of FIG. 1.
Figure 3:
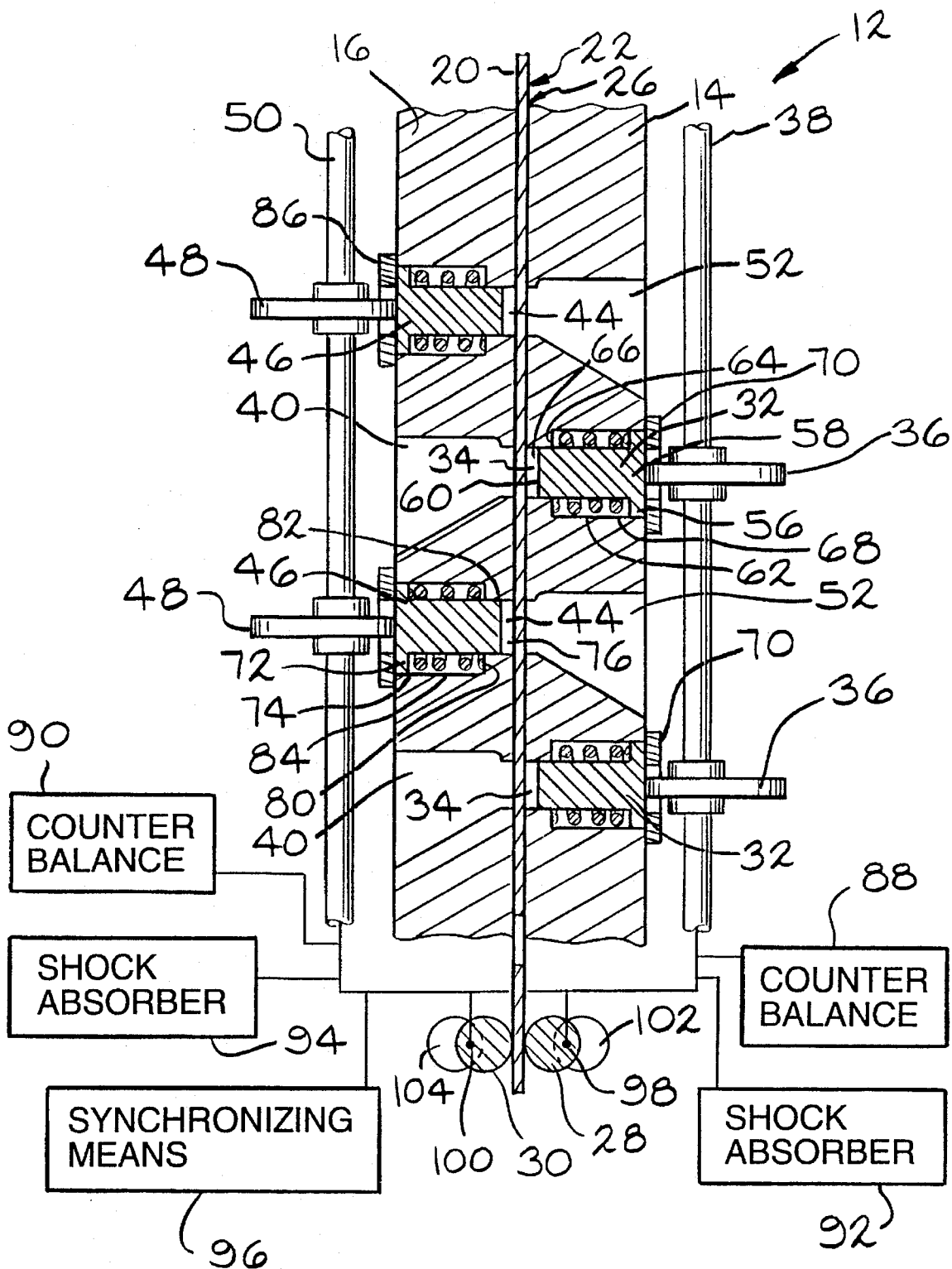
FIG. 3 is a partial, cross-sectional view of a compound punching apparatus for forming a perforated substrate according to the present invention with the punch members in an upstroke position.
Figure 4:
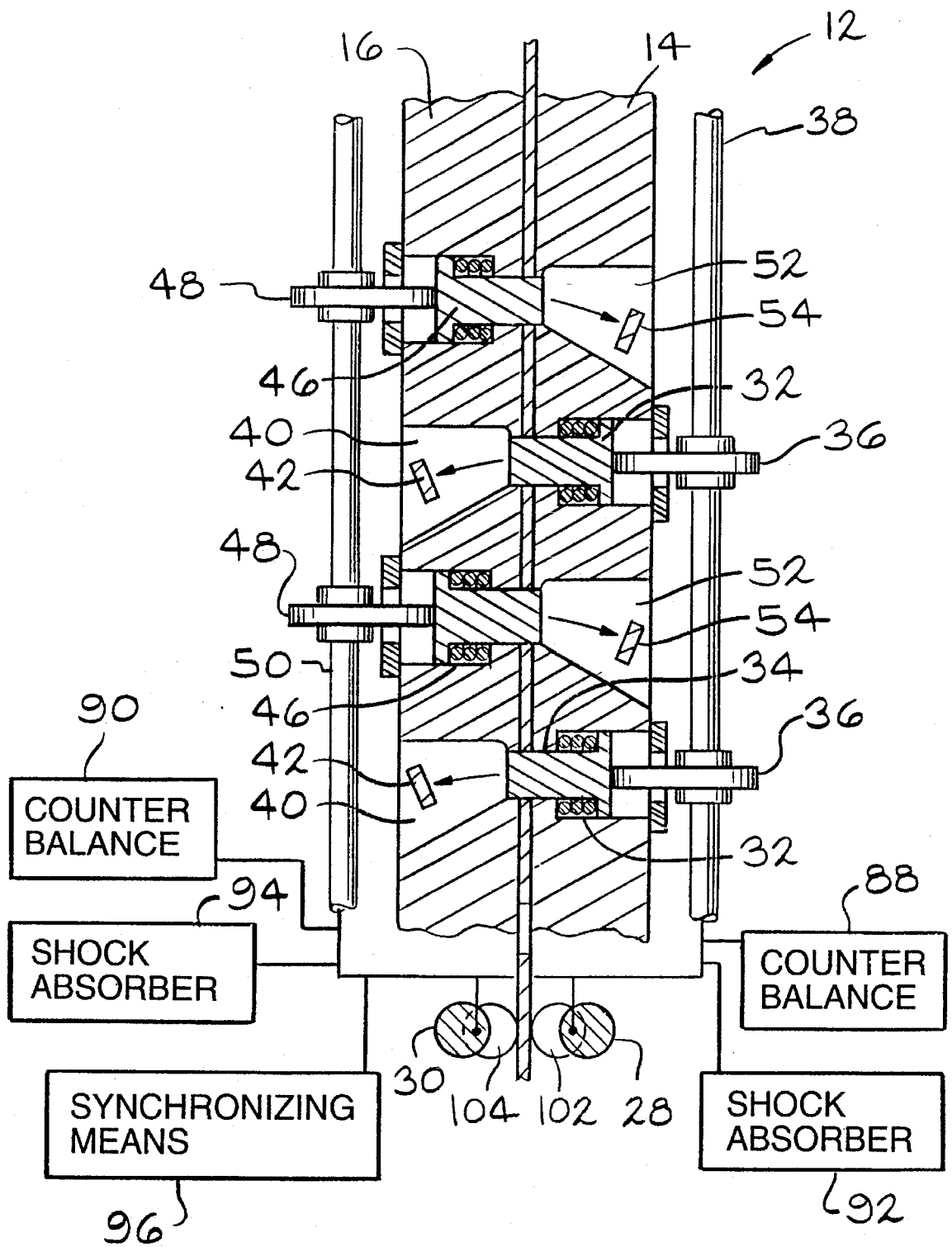
FIG. 4 is a partial, cross-sectional view of the compound punching apparatus shown in FIG. 3, but with the punch members in a downstroke position.

Referring now to the drawings, FIGS. 1 and 2 show a perforated substrate 10, preferably of an electrically conductive material, and formed using the compound punching apparatus 12 of the present invention shown in FIGS. 3 and 4. The compound punching apparatus 12 includes a first plate 14 and a second plate 16 in spaced apart relation. While not shown in the drawings, it is understood that the perforated substrate 10 begins as a roll of unperforated or unapertured sheet material 20 (FIGS. 3 and 4) and that upon being unrolled assumes a generally planar shape having its first and second major surfaces 22 and 24 disposed parallel to each other. The sheet of substrate material 20, for example mild steel substrate, travels along the intermediate space 26 formed between the plates 14,16 by the pulling force of two eccentric rollers 28,30 located adjacent to an end of the respective plates. Other suitable materials for the sheet material 20 include copper, aluminum, iron, nickel, zinc, titanium, stainless steel and alloys thereof.

A plurality of first punch members 32 are fitted in a slidable relationship inside cylindrical openings 34 in the first plate 14. The first punch members 32 engage first cam members 36 which are eccentrically mounted on a rotatable cam drive shaft 38. One complete rotation of the cam drive shaft 38 causes the cam members 36 to reciprocate through a complete punch cycle to move the first punch members 32 inside the openings 34 between an upstroke position (FIG. 3) and a downstroke (FIG. 4) and then back to the upstroke position. In the downstroke position, the rotation of the cam drive shaft 38 has caused the cam members 36 to push the first punch members 32 through the openings 34 in the first plate 14 towards the unperforated substrate 20 until they pierce the sheet material supported on the opposing face of the second plate 16. Chutes 40 are provided in the second plate 16 in registry with the first punch openings 32 and serve as passages through which blanks 42 (FIG. 4) cut from the substrate by the punch members pass to a collection location (not shown).

In a similar manner, the second plate 16 has a plurality of cylindrical openings 44 into which slidable second punch members 46 are fitted. As is the case with the first punch members 32 of the first plate 14, the second punch members 46 engage second cam members 48 which are eccentrically mounted on a second rotatable cam drive shaft 50. One complete rotation of the drive shaft 50 reciprocates the cam members 48 through a complete punch cycle to move the second punch members 46 inside the openings 44 between an upstroke position (FIG. 3) to a downstroke position (FIG. 4) and then back to the upstroke position. In the downstroke position, the rotation of the cam drive shaft 50 has caused the cam members 48 to push the second punch members 46 through the openings 44 to pierce the sheet material 20 supported on the opposing face of the first plate 14. Chutes 52 are provided in the first plate 14 in registry with the second punch openings 44 to remove blanks 54 cut from the sheet material 20 by the second punch members to the collection location (not shown). In that respect, it is preferred that the compound punching apparatus 12 of the present invention is positioned such that the first and second plates 14,16 are oriented to allow gravity to move the blanks 42,54 through the chutes 40,52. Thus, the plates 14,16 are preferably disposed in a side-by-side orientation instead of being oriented one above the other.

One aspect of the present invention is that both the first and second punch cycles are preferably actuated in unison so that the punch members 32,46 substantially simultaneously pierce through the sheet of substrate material 20 during the downstroke phase of the punching cycle. It is also anticipated by the scope of the present invention that the first and second punch cycles are actuated sequentially to pierce through the sheet of substrate material 20. In this latter aspect of the present invention, the term sequential means that either of the punch members 32 or 46 pierces through the substrate material followed by the other punch member with a discernable period of time in the interim between the respective punching events. The period of time can range from a fraction of a second to possibly a seperate production run for piercing each side of the substrate. Whether the punch members 32,46 are substantially simultaneously or sequentially actuated to pierce the substrate material 20, the resulting compound punching technique introduces equal and opposite stress forces into the substrate at each thusly formed perforation that essentially cancel each other and maintain the desired planar characteristics to the perforated substrate 10.

More particularly, the structure of each of the first punch members 32 and their supporting plate 14 will now be described in detail keeping in mind that the second punch members 46, and the second plate 16 have a similar construction. First punch members 32 each have an enlarged portion 56, a body portion 58 and a cutting portion 60. The enlarged portion 56 is sized to fit in a slidable and closely spaced relationship within a large bore portion 62 of the opening 34 that extends to a ledge 64 forming a stepped portion 66. The stepped portion 66 opens into the intermediate space 26 between the plates 14,16 and it has a cross-sectional dimension less than the enlarged portion 56 and sized to receive the body portion 58 of the punch member 32 in a closely spaced relationship. The ledge 64 forms a seat for biasing a spring 68 which is captured around the body portion 58 of the punch member 32 by the enlarged portion 56 of the punch. Each biasing spring 68 forces its associated punch member continuously away from the intermediate space 26 between the plates 14,16. Punch stops 70 are mounted on the outer surface of the plate 14 to partially close the large bore portion 62 of the openings 34 so that the first punch members 32 are prevented from being biased out of their openings 34 due to the force of the springs 68. The punch stops 70 are preferably removable to provide for replacing the punch members 32 at such time as they become worn.

Similarly, the second punch members 46 include an enlarged portion 72, a body portion 74 and a cutting portion 76. The enlarged portion 72 slidably fits in a closely spaced relationship within a large bore portion 78 of the opening 44 and the large bore portion 78 extends to a ledge 80 forming a stepped portion 82 which in turn opens into the intermediate space 26 between the plates 14,16. The stepped portion 80 is sized to receive the body portion 74 of the punch members 46 in a closely spaced relationship while the ledge 80 forms a seat for a biasing spring 84 captured around the body portion 74 by the enlarged portion 72 of the punch. Springs 84 bias their associated punch members 46 continuously away from the intermediate space 26 while removable punch stops 86 partially close the large bore portion 78 of the openings 44 to prevent the second punch members 46 from being biased out of their openings 44 by the springs.

FIG. 3 shows the punch members 32 and 46 supported by the respective first and second plates 14 and 16 at the zenith of their upstroke position wherein they are not punching through the unperforated sheet material 20. In this position, the cam members 36,48 eccentrically mounted on the cam drive shafts 38,50 are at their shortest distance between the shaft and the punch members. As the eccentric cams 36,48 rotate on the shafts 38,50, the punch members 36,46 are forced against the biasing force of the springs 68,84 to punch through the unperforated sheet material 20 to form the perforated substrate 10 (FIGS. 1, 2 and 4). As the shafts 38,50 continue to rotate, the distance across the cams 36,48 to the shafts 38,50 decreases and the upward force of the biasing springs 68,84 cause the punch members 32,46 to move away from the intermediate space 26 following the trace of the cam members 36,48.

As previously discussed, an important aspect of the present invention resides in the compound punching of the sheet material 20 by the punch members 32,46 disposed on either side thereof. Then upon completion of a punch cycle, whether the punching is substantially simultaneous or sequential, the punch members 32,46 are withdrawn from the perforated substrate 10 as the drive shafts 38,50 rotate to position the cam members 36,48 at their upstroke position at the shortest distance with respect to the shafts. The sheet strip of substrate material is then indexed forward by action of the eccentric rollers 28,30 prior to the next punching event.

During the compound punching of the sheet material, whether the punching is substantially simultaneous or sequential it is critically important that the reciprocation of the punch members be accurately controlled so that there is always maintained a similar distance between adjacent perforations punched through the opposite major surfaces 22,24 of the unperforated substrate 20. Therefore, counterbalances, indicated as blocks 88, 90, respectively and shock absorbers, indicated as blocks 92, 94, respectively are preferably provided on each cam drive shaft 38, 50 to ensure perfectly balanced movement throughout the entire cycle of the punching event. Furthermore, it is critically important that the indexing movement of the sheet of substrate material be accurately controlled by the eccentric rollers 28,30. The rollers 28,30 are constructed to move the sheet material during the upstroke phase of the punch cycle when the punch members 32,46 are both biased upwardly in the openings 34,44 (FIG. 3). Thus, at such time as the punch members began their downstroke motion under the influence of the cams 36,48, the eccentric rollers 28,30 rotate out of contact with the perforated substrate 12 thereby causing the substrate to remain stationary during the downstroke phase of the punch cycle (FIG. 4).

In that manner, a synchronizing means, indicated as block 96 in FIGS. 3 and 4 governs the rotational movement of the cam drive shafts 38,50 with respect to the rotational movement of the eccentric rollers 28, 30 mounted on roller drive shafts 98 and 100. The rollers 28, 30 cause movement of the substrate in a forwardly direction along the intermediate space 26 between the plates 14,16 through a predetermined arc of rotation so that upon the commencement of a subsequent punching cycle, the substrate sheet has advanced only to the extent necessary to provide an unpunched portion aligned with the punch members 32,46 and so that the leading punch members are spaced from the trailing perforations a distance exactly equal to that between alternating perforations punched through opposite major surfaces of the substrate.

When the sheet of substrate material no longer engages the eccentric rollers 28,30, the synchronizing means 96 causes the cam drive shafts 38,50 to rotate the cams 36,48 to force the opposing punch members 32,46 into the downstroke phase of the punching cycle against the biasing force of the springs 68,84. This causes the punch members to pierce through both major surfaces of the sheet of unperforated material 20. During rotation of the cam drive shafts 38,50, the biasing springs 68,84 continuously force the punch members 38,46 away from the substrate and against the trace of the cam members. The counterbalances 102, 104 on the roller drive shafts 98, 100 and the counterbalances 88, 90 on the cam drive shafts 38,50 maintains the rotating motion of these shafts in a vibration free condition while the synchronizing means 96 assures step-wise compound punching and advancement of the sheet substrate 20 to provide a uniformly punched and planar product.

Thus, in its finished, punched form, the perforated substrate 10 has a multiplicity of perforations or apertures 106, (FIGS. 1 and 2), each having a substantially circular shape and patterned such that when viewed in any direction along either of the major surfaces, every other perforation 106 has been punched through the thickness of the substrate from the alternating first and second major surfaces 22 and 24. Preferably, the perforation 106 have a diameter of between about 0.5 mm to about 3.0 mm. and are provided at an aperture rate of between about 25% to about 75% of the surface area of the substrate material. Furthermore, the sheet material preferably has a thickness of between about 0.013 mm to 0.25 mm.

As shown in FIG. 2, the thusly punched substrate 10 has a surrounding stress region in the form of a burr 108 at each perforation, the stress region projecting outwardly away from the plane of the major surface opposite the major surface into which the punch member was introduced to form the perforation. Each burr sets up stress forces in the immediate vicinity of the perforation that tends to cause the sheet of substrate material to deform from its original planar shape. However, by forming alternating perforations from opposite sides of the substrate the thusly formed burrs are caused to alternately project beyond the opposite major surfaces. Since the perforations are of a similar shape, the alternating burr patterns set up equal and opposite stress forces throughout the punched expanse of the substrate. Perforation shapes other than circular shapes are also useful with the present compound punching apparatus 12 to provide a suitably perforated substrate.

In that manner, while each perforation may have localized stress forces, over the expanse of the substrate extending in any direction, these localized stress forces cancel each other to provide the generally planar characteristics to the perforated substrate. Thus, the present perforated substrate is capable of being provided in lengths and widths substantially greater than conventionally punched substrates while meeting and exceeding tolerance specifications for planarity required for commercial production of batteries.

Thus, in the method of the present invention, half of the perforations are formed from one side of the substrate and the other half are formed from the opposite side. This compound punching technique introduces equal and opposite stress forces into the substrate which essentially cancel each other and provide for a more planar product than that which is obtainable by the prior art. As a result, there is provided an electrode component, such as is useful as a current collector for an electrochemical cell, wherein an equal number of uniformly distributed perforations are formed through the opposed major surfaces of the substrate. By evenly alternating the distribution pattern of the perforations provided through the opposed major surfaces, the stress forces produced at each perforation are essentially cancelled by the adjacent perforations formed through the opposite major surface of the substrate. In that manner, the perforated substrate maintains a relatively planar shape.

It is appreciated that various modifications to the inventive concepts described herein may be apparent to those of ordinary skill in the art without departing from the spirit and scope of the present invention as defined by the appended claims.

What is claimed is:

1. A perforated and substantially planar substrate comprising coplanar first and second major surfaces, each major surface having a similar pattern of stress regions provided by each perforation formed having a portion of the substrate surrounded by the stress region removed therefrom, the perforations having an alternating configuration from one surface to the other between immediately adjacent stress regions along any direction of either of the surfaces to introduce equal and opposite stress forces into the substrate that essentially cancel each other to provide the planar characteristic to the perforated substrate.

2. The substrate of claim 1 wherein the stress region at each perforation is a burr.

3. The substrate of claim 1 comprising an electrically conductive material.

4. The substrate of claim 1 adopted for use as a current collector in an electrochemical cell.

5. The substrate of claim 1 comprising an electrically conductive material selected from the group consisting of steel, copper, aluminum, iron, nickel, zinc, titanium, stainless steel and alloys thereof.

6. The substrate of claim 1 wherein a thickness between the first and second major surfaces is between about 0.013 mm. to about 0.25 mm. thick.

7. The substrate of claim 1 wherein the perforations have a generally circular shape.

8. The substrate of claim 6 wherein the perforations have a diameter of about 0.5 mm. to about 3.0 mm.

9. The substrate of claim 1 wherein the perforations are provided in the substrate at a perforation rate of between about 25% to about 75%.

10. A perforated and substantially planar substrate comprising coplanar first and second major surfaces, wherein each major surface has a similar pattern of perforations, each perforation punched therein from one of the surfaces and extending through the other surface in an alternating configuration from one surface to the other between immediately adjacent perforations along any direction of either of the surfaces to introduce equal and opposite stress forces provided by each perforation formed having a portion of the substrate surrounded by the stress forces removed therefrom, the stress forces essentially cancelling each other to provide the planar characteristic to the perforated substrate.

11. The substrate of claim 10 wherein the perforations form burrs at the other surface in the alternating configuration.

12. The substrate of claim 10 adopted for use as a current collector in an electrochemical cell.

13. The substrate of claim 10 comprising an electrically conductive material.

14. The substrate of claim 10 comprising an electrically conductive material selected from the group consisting of steel, copper, aluminum, iron, nickel, zinc, titanium, stainless steel and alloys thereof.

15. The substrate of claim 10 wherein a thickness between the first and second major surfaces is between about 0.013 mm. to about 0.25 mm. thick.

16. The substrate of claim 11 wherein the perforations have a generally circular shape.

17. The substrate of claim 16 wherein the perforations have a diameter of about 0.5 mm. to about 3.0 mm.

18. The substrate of claim 10 wherein the perforations are provided in the substrate at a perforation rate of between about 25% to about 75%.

19. A perforated and substantially planar substrate comprising coplanar first and second major surfaces, wherein each major surface has a similar pattern of perforations, each perforation beginning at one of the surfaces and extending through the other surface in an alternating configuration from one surface to the other between immediately adjacent perforations along any direction of either of the surfaces to introduce equal and opposite stress forces provided by each perforation formed having a portion of the substrate surrounded by the stress forces removed therefrom, the stress forces essentially cancelling each other to provide the planar characteristic to the perforated substrate.

20. The substrate of claim 19 adopted for use as a current collection in an electrochemical cell.

21. The substrate of claim 19 comprising an electrically conductive material.

22. The substrate of claim 19 wherein the perforations form burrs at the other surface with alternating configuration.

23. The substrate of claim 19 comprising an electrically conductive material selected from the group consisting of steel, copper, aluminum, iron, nickel, zinc, titanium, stainless steel and alloys thereof.

24. The substrate of claim 19 wherein a thickness between the first and second major surfaces is between about 0.013 mm. to about 0.25 mm. thick.

25. The substrate of claim 19 wherein the perforations have a generally circular shape.

26. The substrate of claim 25 wherein the perforations have a diameter of about 0.5 mm. to about 3.0 mm.

27. The substrate of claim 19 wherein the perforations are provided in the substrate at a perforation rate of between about 25% to about 75%.

* * * * *